United States Patent [19]
Aoki

[11] Patent Number: 5,799,218
[45] Date of Patent: Aug. 25, 1998

[54] ROTARY ENCODER

[75] Inventor: Nobuhiro Aoki, Omiya, Japan

[73] Assignee: Fuji Photo Optical Co., Ltd., Saitama, Japan

[21] Appl. No.: 671,000

[22] Filed: Jun. 28, 1996

[51] Int. Cl.[6] .................................................. G03B 17/00
[52] U.S. Cl. .............................................................. 396/297
[58] Field of Search ................................. 396/297, 299, 396/661, 133

[56] References Cited

U.S. PATENT DOCUMENTS

| | | | |
|---|---|---|---|
| 4,742,367 | 5/1988 | Amano et al. | 354/289.1 |
| 5,005,033 | 4/1991 | Miyasaka | 354/289.1 |
| 5,283,606 | 2/1994 | Konno et al. | 354/289.1 |
| 5,485,238 | 1/1996 | Miura et al. | 354/289.12 |

*Primary Examiner*—Daniel P. Malley
*Attorney, Agent, or Firm*—Young & Thompson

[57] ABSTRACT

A rotary encoder which provides multiple-bit encoded signals according to predetermined angular positions comprises a ground segment pattern having a circular arrangement of conductive ground segments and a signal segment pattern having at least one circular arrangement of different conductive signal segments corresponding to bits of each multiple-bit encode signal, which is formed in a circle concentric with the circular arrangement of conductive ground segments, and a rotary contact having a plurality of contact points making contact with the conductive signal segments in each predetermined angular position and a contact point making contact with the conductive ground segments to provide bit signals forming the multiple-bit encoded signal.

4 Claims, 8 Drawing Sheets

FIG. 10

TABLE I

| BACK COVER SWITCH (41) | SELECT DIAL (38) | AF BUTTON (46) | OTHER SWITCHES | ACTIONS |
|---|---|---|---|---|
| OPEN | — | — | | MOTOR DRIVE |
| CLOSED | ISO MODE | — | | ISO FILM SPEED SETTING |
| CLOSED | A MODE<br>M MODE | — | | APERTURE SIZE SETTING |
| CLOSED | P MODE<br>A MODE | — | | EV VALUE CORRECTION SETTING |
| CLOSED | M MODE | — | EXPOSURE CORRECTION BUTTON ON | SHUTTER SPEED SETTING |
| CLOSED | P MODE<br>A MODE<br>M MODE | — | DATA BUTTON ON | DATA SETTING |
| CLOSED | P MODE<br>A MODE<br>M MODE | MF MODE | MF BUTTON ON | DISTANCE SETTING |

FIG. 11
TABLE II

| | S1 | S2 | S3 | S4 |
|---|---|---|---|---|
| P1 | O | X | X | O |
| | X | X | X | X |
| P2 | X | X | X | X |
| | X | X | O | X |
| P3 | X | X | O | X |
| | X | O | O | X |
| P4 | X | O | O | X |
| | X | O | O | O |
| P5 | X | O | O | O |
| | X | O | O | O |
| P6 | X | O | X | O |
| | X | O | X | O |
| P7 | X | O | X | X |
| | O | O | X | X |

| | S1 | S2 | S3 | S4 |
|---|---|---|---|---|
| P8 | O | O | X | X |
| | O | O | X | X |
| P9 | O | X | X | X |
| | O | X | O | X |
| P10 | O | X | O | X |
| | O | O | O | X |
| P11 | O | O | O | X |
| | O | O | O | O |
| P12 | O | X | O | O |
| | X | X | X | X |
| P13 | X | X | O | O |
| | X | X | O | O |
| P14 | X | X | X | O |
| | O | X | X | O | ns
ROTARY ENCODER

BACKGROUND OF THE INVENTION

1. Field of the Invention

This invention relates to a rotary encoder for data entry, and more particularly, to a rotary encoder which detects rotational positions of a dial for setting, for instance, exposure conditions of a camera, such as an aperture size, a shutter speed, a focus distance and the like.

2. Description of the Related Art

Conventionally, there have been known a rotary type of encoder comprising signal patterns and a ground pattern, which are formed in concentric circles on a substrate, for forming respective bits of a multiple-bit encoded signal and an electrically conductive member having contacts which slide and rub on the ground pattern and the signal patterns to provide an encoded signal representing a rotational or angular position of the electrically conductive member. However, with such a rotary type encoder, as the number of bits of an encoded signal increases, the number of concentric circle signal patterns must be increased, with a resulting increase in diameter and overall size of the rotary type encoder.

SUMMARY OF THE INVENTION

It is an object of the invention to provide a compact rotary type encoder in which the number of concentric circuit signal patterns is less than the number of bits of an encoded signal.

It is another object of the invention is to provide a rotary type encoder which is compact in size.

These objects of the invention are accomplished by providing a rotary type encoder for providing multiple-bit encoded signals which comprises a ground segment pattern and a signal segment pattern. The ground segment pattern is completed by an approximately entire circular arrangement of a plurality of conductive ground segments, and the signal segment pattern is completed by at least a circular arrangement of a plurality of different conductive signal segments, corresponding to bits of the multiple-bit encoded signal, which is concentric with the circular arrangement of conductive ground segments. A rotary contact having a plurality of contact points is in slidable contact with the conductive signal segments in different regular angular positions and at least one contact point makes slide contact with the conductive ground segments to provide bit signals forming a multiple-bit encoded signal in each regular angular position.

With the rotary type encoder of the invention, at least one of the concentric conductive segment arrangements includes a plurality of different signal segments, and these signal segments are contacted by a plurality of contact points arranged at regular angular positions. In other words, because a plurality of conductive signal segments are arranged in a single circle, a multiple-bit encoded signal is obtained by means of the plurality of contact points making contact with these conductive signal segments. Together, a second concentric signal segment pattern is formed inside the first concentric signal segment pattern, which enables an encoded signal to be include an increased number of bits.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 10 is a table indicating various camera operation modes and actions created by operations of various switches and buttons; and FIG. 11 is a table indicating bit signals provided at given angular positions and in-between positions.

DETAILED DESCRIPTION OF THE SPECIFIC EMBODIMENT

Figure 1:
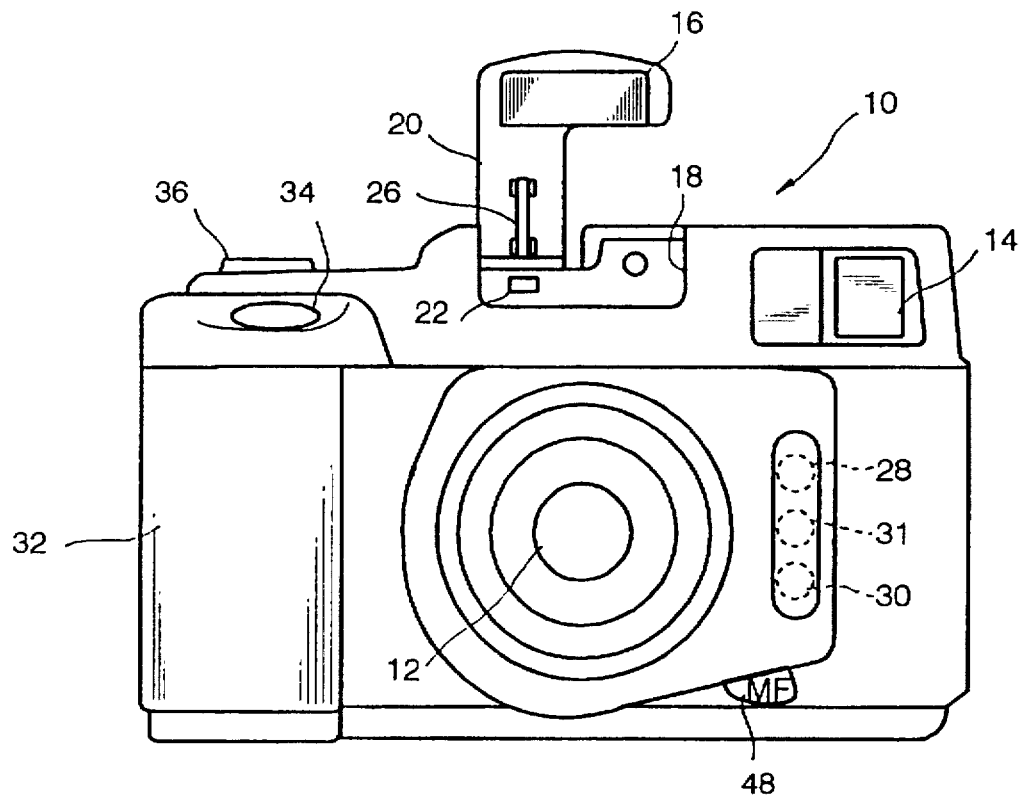
FIG. 1 is a front view of a camera equipped with a rotary encoder of the invention.
Figure 2:
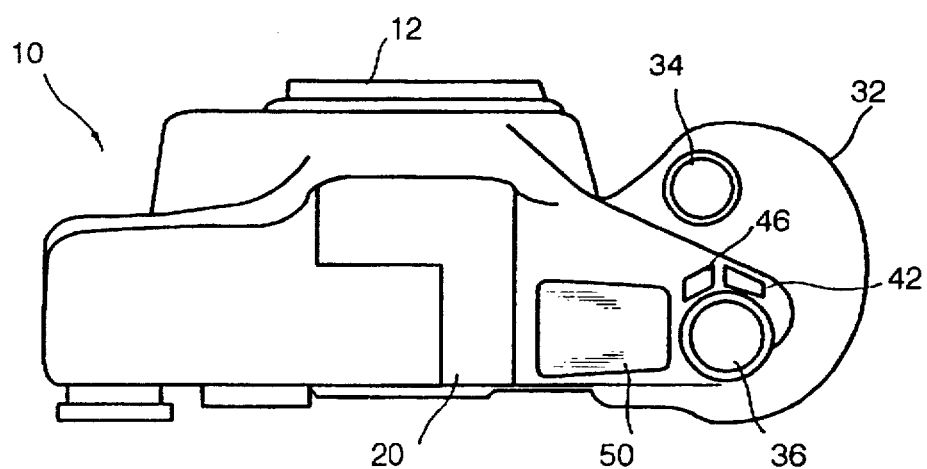
FIG. 2 is a top view of the camera shown in FIG. 1.
Figure 3:
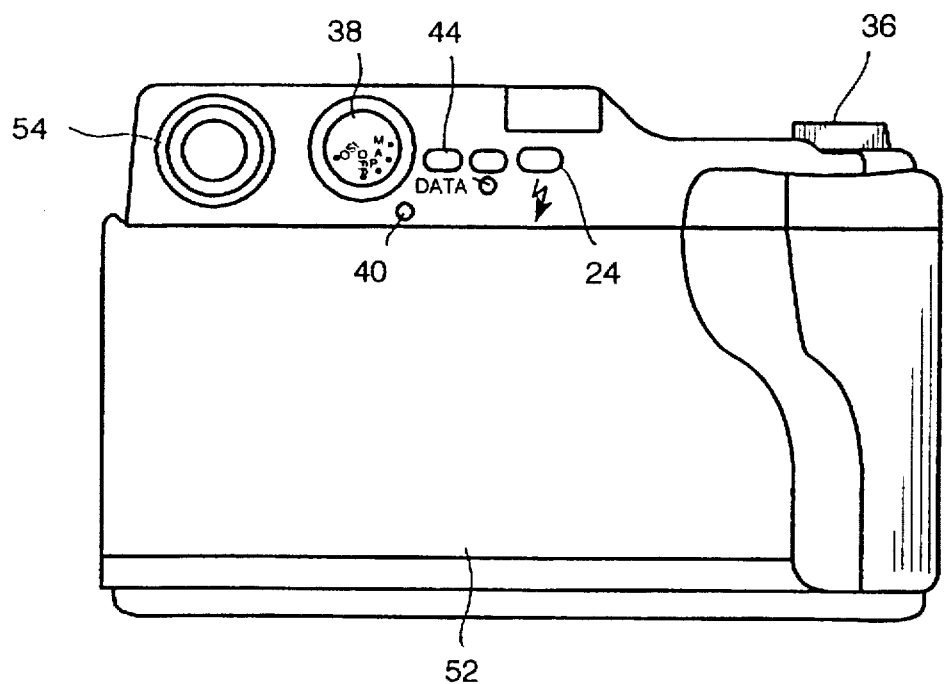
FIG. 3 is a rear view of the camera shown in FIG. 1.

Referring to the drawings in detail, in particular, to FIGS. 1 to 4, a camera equipped with a rotary type encoder according to a preferred embodiment of the invention is shown. The camera, which is, for instance, of a type using a Brownie film, is provided with a taking lens 12 positioned at the approximate front center of the camera body 10 as shown in FIG. 1, and an illuminating window type viewfinder 14 positioned in the top right corner of the camera body 10. Denoted by a reference numbers 54 in FIG. 3 is an eyepiece of the viewfinder 14. The camera is further provided with an electronic flash unit 16 positioned above the taking lens 12, and is mounted for up and down pivotal movement in a depression 18 formed at the top of the camera body 10. When the electronic flash unit 16 is received into the depression 18, an engagement groove formed in an arm 20 of the electronic flash unit 16 is brought into engagement with a hook 22 in the depression 18, so that the electronic flash unit 16 is locked in its received state in the depression 18. In addition, the electronic flash unit 16 is released from the engagement by depressing a lock release button 24 provided at the back of the camera body 10 shown in FIG. 3 to be erected on the depression 18 under the applied force of an urging means, such as a spring, and is held in the extended position shown in FIG. 1. The arm 20 is given increased rigidity by a link mechanism 26 while it is in extended position. The camera is equipped with an automatic focusing system and an automatic exposure control system and their light-projecting unit 28 and light-receiving units 30 and 31 are positioned on the right side of the taking lens 12 as viewed in the drawings and arranged vertically adjacent to one another. A grip 32 is formed at the left side of the camera body 10, and at the top of the grip 32, there is located a shutter button 34.

Figure 4:
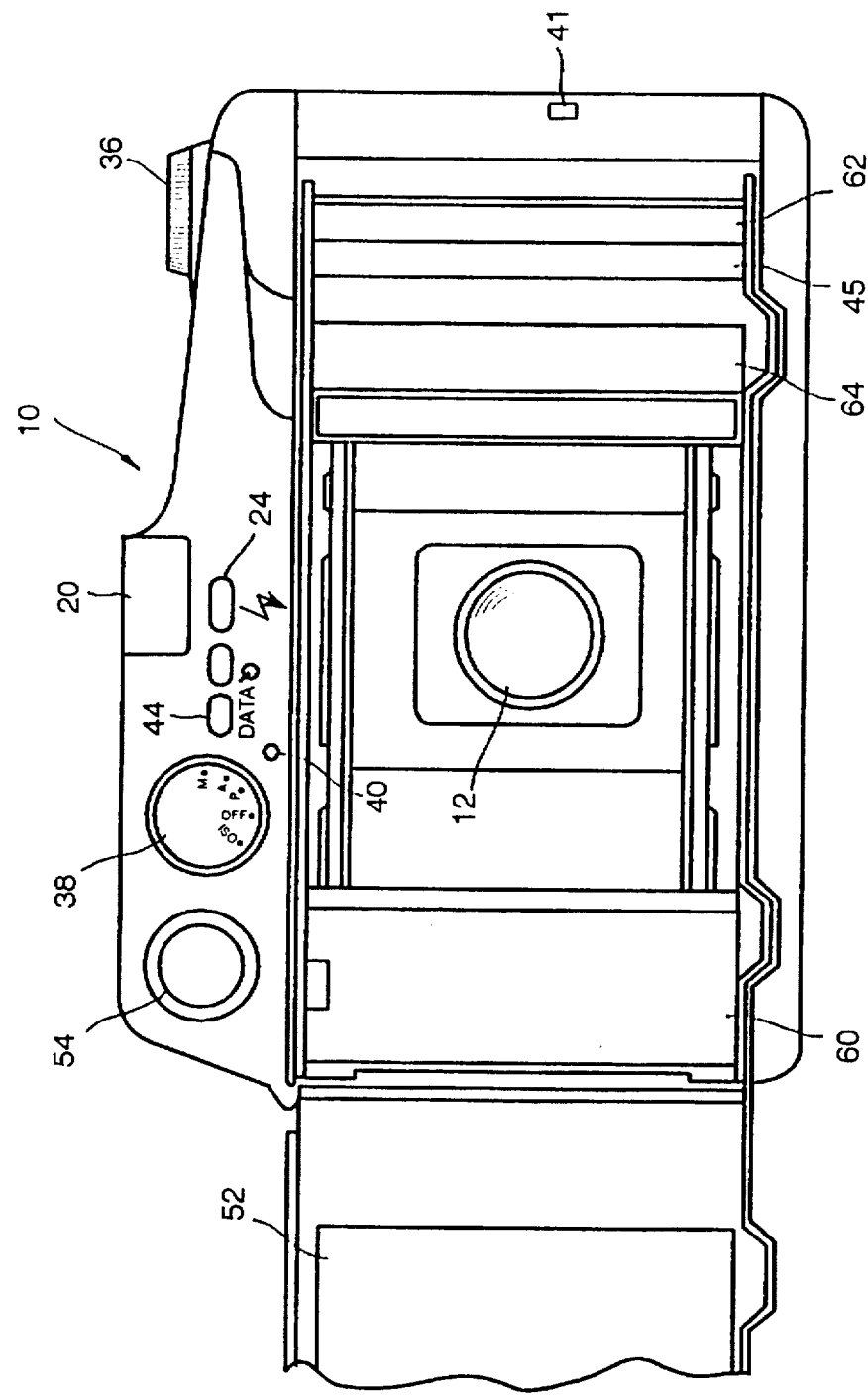
FIG. 4 is a rear view of the camera with a back cover is opened.

As shown in FIGS. 1 and 2, an up/down dial 36 is positioned adjacent to the shutter button 34. This up/down dial 36, which is capable of forward and reverse rotation and provides signals indicating 14 regular rotational or angular positions for each single rotation, is operated to set exposure conditions, including aperture size, exposure correction parameter, shutter speed, subject distance, film speed or sensitivity defined by ISO (international Organization for Standardization), date of photography and the like, and also operated to enter the fact that a Brownie film is loaded by attaching the leader paper of a Brownie film to a take-up spool 45 (FIG. 4). Specifically, the up/down dial 36 is operated in combination with an exposure mode select dial 38, an exposure correction button 42, a focusing mode switching button 46 for switching the camera operation mode between an automatic focusing mode (AF) and a manual focusing mode (MF), a back cover switch 41 (see FIG. 4) which detects the released state of the back cover 52, a data record mode button 44 and a subject distance setting mode button 48, all of which are provided at the back of the camera body 10, to create various modes and actions as indicated in Table I shown in FIG. 10. The select dial 38 is unlocked by depressing the select dial lock button 40 to be operated for selection of any one out of various modes, such as a manual exposure control mode (M), an aperture-priority exposure control mode (A), a programmed exposure control mode (P), and an ISO setting mode (ISO) which is selected when setting an ISO sensitivity of a film. Further, the select dial 38 is used to turn off the main power source (OFF).

As indicated in Table I in FIG. 10, when the up/down dial 36 is operated while the back cover switch 41 detects opening of the back cover 52, a film wind/rewind motor is driven in response to operation of the up/down dial 36 regardless of the selected mode. In other words, the film wind/rewind motor is caused to rotate a predetermined amount necessary to rotate the take-up spool 45 through a predetermined angle every time a signal indicating a selected one of the operation modes is provided from the up/down dial 36. In this instance, as shown in FIG. 4, this camera has a film receiving chamber 60 into which a roll of Brownie film is loaded, and a film take-up chamber 62 into which the Brownie film is transported and wound around the take-up spool 45 during the rotation of the take-up spool 45. A controller (not shown) installed in the camera controls the film wind/rewind motor to automatically place the first frame of the film in an exposure position and to rewind the film into the film receiving chamber 60 after the completion of exposure of all frames of the film, as well as to advance every exposed frame of the film. The amount of film advancement for automatic one frame wind control is detected by the amount of rotation of a roller 64 rotating following the advancement of film. When the camera is loaded with a Brownie film, the Brownie film is put into the film receiving chamber 60 of the camera with the back cover 52 opened, and the lead paper of the Brownie film is inserted into a slot of the take-up spool 45 in the film take-up chamber 62. At this time, the take-up spool 45 is rotated suitably in the winding direction until it is verified that the leader has successfully been wound around the take spool 45. In order to cause rotation of the wind-up spool 45 after loading the film, the up/down dial 36 is operated. On the other hand, while the back cover switch 41 detects that the back cover 52 is closed, the functions of the up/down dial are specified through combinations of operation of the select dial 38, the focusing mode switching button 46, and other switches. Specifically, when the ISO setting mode (ISO) has been selected by the select dial 38, the ISO sensitivity of the film loaded in the camera is set through operation of the up/down dial 36. The setting is displayed on a liquid crystal display (LCD) panel 50 (see FIG. 2) positioned in close proximity to the up/down dial 36. When the select dial 38 selects the aperture-priority exposure control mode (A) or the manual exposure control mode (M), the up/down dial 36 selects the aperture size. Further, while the select dial 38 selects the programmed exposure control mode (P) or the aperture-priority exposure control mode (A), when the exposure correction button 42 is turned on, the up/down dial 36 changes an exposure value (EV) which has been automatically set on the basis of a photometric value in increments or decrements of a half exposure value within a range of +/-2 EV. Furthermore, while the select dial 38 selects the manual exposure control mode (M), when the exposure correction button 42 is turned on, the up/down dial 36 selects the shutter speed. While the select dial 38 selects any one of the programmed exposure control mode (P), the aperture-priority exposure control mode (A) and the manual exposure control mode (M), when the data record mode button 44 is turned on to enable data record, the up/down dial 36 selects the date to be recorded. While the select dial 38 selects any one of the programmed exposure control mode (P), the aperture-priority exposure control mode (A) and the manual exposure control mode (M), the focusing mode switching button 46 changes the camera mode to the manual focusing mode (MF). In this manual focusing mode (MF), when the subject distance setting mode button 48 is turned on, the up/down dial 36 sets 14 different divisions of subject distances ranging from 0.7 m to infinity. In this instance, while the focusing mode switching button 46 is operated to select the AF mode, when the subject distance setting mode button 48 is turned on following a depression of the shutter button 34 to a half-way with the result of focusing the taking lens 12 on an intended subject, the taking lens 12 is held focused on the intended subject even when the shutter button 34 is released.

Figure 5:
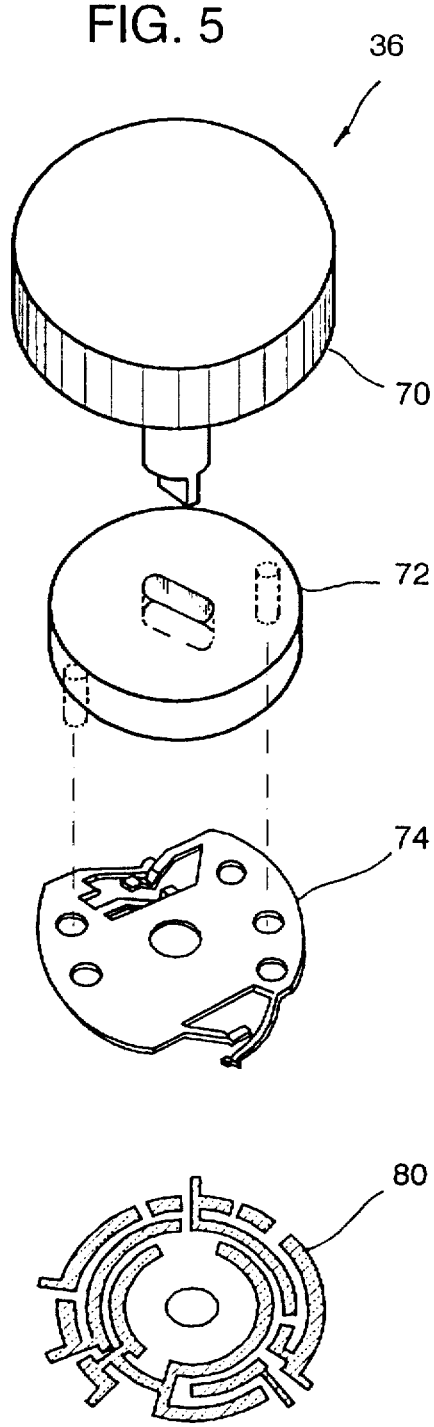
FIG. 5 is an exploded perspective view of a rotary encoder in accordance with an embodiment of the invention.
Figure 6:
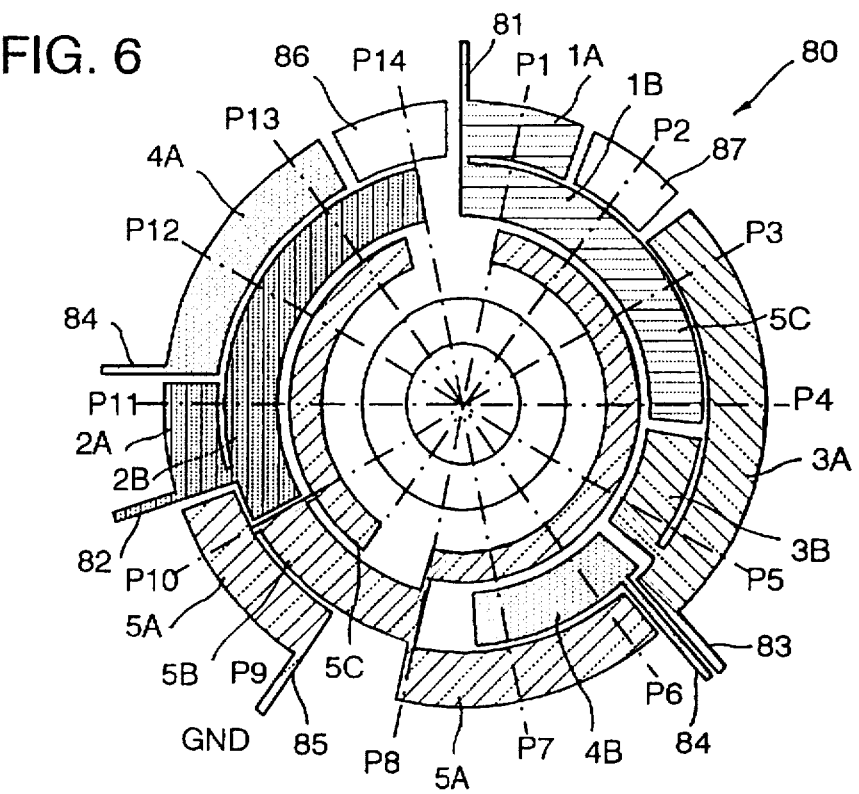
FIG. 6 is a plan view of a conductive segment pattern of the rotary encoder.
Figure 7:
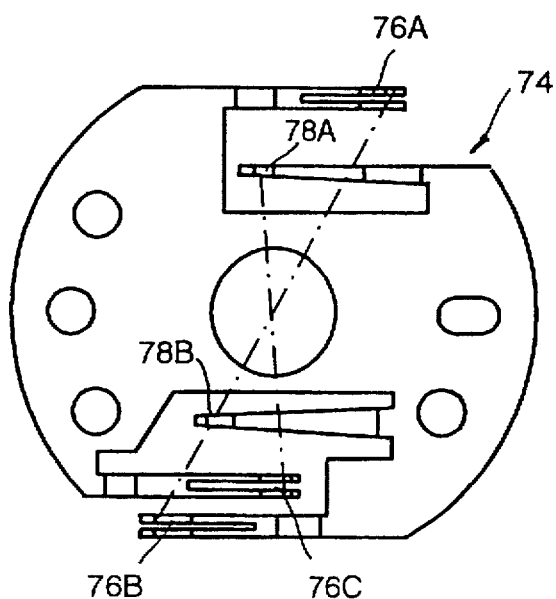
FIG. 7 is a plan view showing details of a contact disk of the rotary encoder.

Referring to FIG. 5 showing the construction of the up/down dial 36, the up/down dial 36 is composed primarily of a knob 70, an attaching disk 72, a conductive contact disk 74 and a conductive segment pattern disk 80. The conductive contact disk 74 is attached to the knob 70 through the attaching disk 72. The conductive segment pattern disk 80 is formed with a circular ground segment pattern and a plurality of circular signal segment patterns, formed on a substrate (not shown), to provide multiple-bit encode signals as described hereafter. When the knob 70 is rotated to cause the conductive contact disk 74 to slide and contact the signal segment patterns, the conductive contact disk 74 appropriately short circuits the ground segment pattern and signal segment patterns to provide encoded signals in accordance with its 14 regular angular positions. As shown in detail in FIG. 6, the conductive segment pattern disk 80 is composed of three circular segment patterns in the form of concentric circles, each comprising a plurality of conductive segments. Specifically, the first or outermost circular signal segment pattern is composed by four conductive signal segments 1A, 2A, 3A and 4A, two conductive ground segments 5A and electrically insulated floating segments 86 and 87, all of these segments being electrically separated from one another. These conductive signal segments 1A to 4A are integrally formed with signal output extensions 81 to 84, respectively. One of the conductive ground segments 5A are integrally formed with signal output extensions 85 connected to ground GND. Bit signals S1-S4 are output through these signal output extensions 81 to 84. Similarly, the second or intermediate circular signal segment pattern is completed by four conductive signal segments 1B, 2B, 3B and 4B and a conductive ground segment 5B electrically separated from one another, and the third or innermost circular signal segment pattern is completed by two conductive ground segments 5C are approximately semi-circular but asymmetrical with respect to the center of the first to third circular signal segment patterns. The conductive signal segment 4B of the second signal segment pattern is integrally formed with a signal output extension 84 through which a bit signal S4 is output. Each pair of the first to third conductive signal segments of the first and second signal segment patterns, namely the conductive signal segments 1A and 1B, 2A and 2B, and 3A and 3B, are electrically connected to each other, and all of the conductive ground segments 5A, 5B and 5C of the first through third circular signal segment patterns are electrically integrated to one another. As shown in FIG. 7, the conductive contact disk 74 is integrally formed with two elastic contact arms 76A and 76B in slidable contact with the conductive signal segments 1A to 4A and conductive ground segments 5A of first circular signal segment pattern at different angular positions, an elastic contact arm 76C in slidable contact with the conductive signal segments 1B to 4B and conductive ground segment 5B of second circular signal segment pattern, and two elastic contact arms 78A and 78B in slidable contact with the conductive ground segments 5C of third circular ground segment pattern at different angular positions. The two contact arms 76A and 76B are positioned symmetrically with respect to the center of rotation O of the conductive contact disk 74. The contact arm 76C is positioned at an angle of approximately 360°/14 from the contact arm 76B. The two contact arms 78A and 78B are positioned asymmetrically with respect to the center of rotation O of the conductive contact disk 74. In more detail, the contact arm 78A is at a position angularly shifted approximately 360°/14 from the contact arm 76A, and the contact arm 78B is at the same angular position as the contact arm 76B.

The operation of the up/down dial 36 will be hereafter described with reference to FIGS. 8 and 9. The up/down dial 36 is adapted to provide a four-bit encoded signal at each one of 14 regular angular positions P1 through P14 and is provided with a click stop mechanism (not shown) to stop the knob 36 (and hence the conductive contact disk 74) at each of regular angular positions P1–P14.

Figure 8:
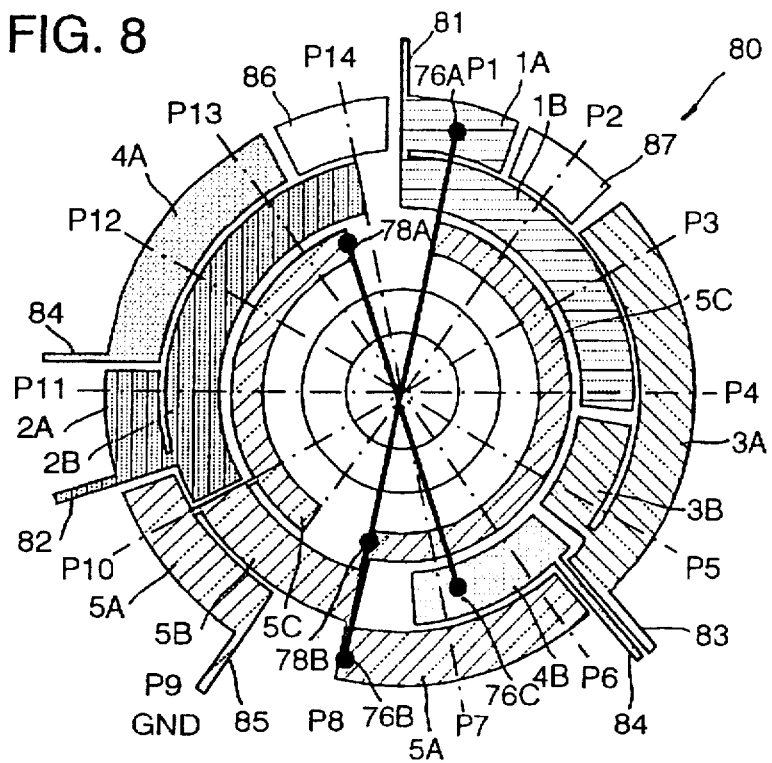
FIG. 8 is a view showing the positional relationship between the conductive segment patterns and contact points when the rotary encoder assumes a regular angular position P1.

FIG. 8 shows the positional relationship between the signal segment patterns on the conductive segment pattern disk 80 and the conductive contact disk 74 when the up/down dial 36 selects the angular position P1. For simplicity, only the contact points of the contact arms 76A–76C, 78A and 78B of the conductive contact disk 74 are shown in FIG. 8. In the state where the up/down dial 36 selects the angular position P1, the contact arm 76A makes contact with the conductive signal segment 1A; the contact arms 76B, 78A and 78B make contact with the conductive ground segments 5A and 5C; and the contact arm 76C makes contact with the conductive signal segment 4B. Accordingly, a four-bit encoded signal provided through the signal output extensions 81–84 is represented by a combination or pattern of bit signals S1, S2, S3 and S4 assuming O, X, X and O, respectively, in the angular position P1. Here, the symbol "O" for a bit signal indicates a state in which a conductive signal segment is connected to a conductive ground segment by means of the conductive contact disk 74. The symbol "X" for a bit signal indicates a state in which a conductive signal segment is not in contact with any contact arm of the conductive contact disk 74. When the conductive contact disk 74 is rotated in a clockwise direction from the angular position P1 shown in FIG. 8, the bit signals S1, S2, S3 and S4 assume signal patterns at the regular angular positions P2 through P14 and respective in-between angular positions as indicated in Table II in FIG. 11. As is clear from Table II, the up/down dial 36, in particular the conductive segment pattern disk 80 and the conductive contact disk 74, is configured such that it changes simultaneously two out of the four bit signals, for instance the bit signals S1 and S4, of the four-bit encode signal from the state "O" to the state "X" when shifting from the regular angular position P1 to the angular position between the regular angular positions P1 and P2 and, however, changes only either one of the four bit signals of the four-bit encode signal from the state "O" to the state "X" or vise versa between each adjacent regular angular positions.

In a position shift, such as a shift to the angular position between the regular angular positions P1 and P2, which causes two or more bit signals to change simultaneously all of the contact arms in contact with the conductive ground segments are electrically floated to make the ground segment non-conductive, in advance to bringing the contact arms into contact with another conductive signal segments, respectively, preventing erroneous encode signals from being provided during a position shift.

Figure 9:
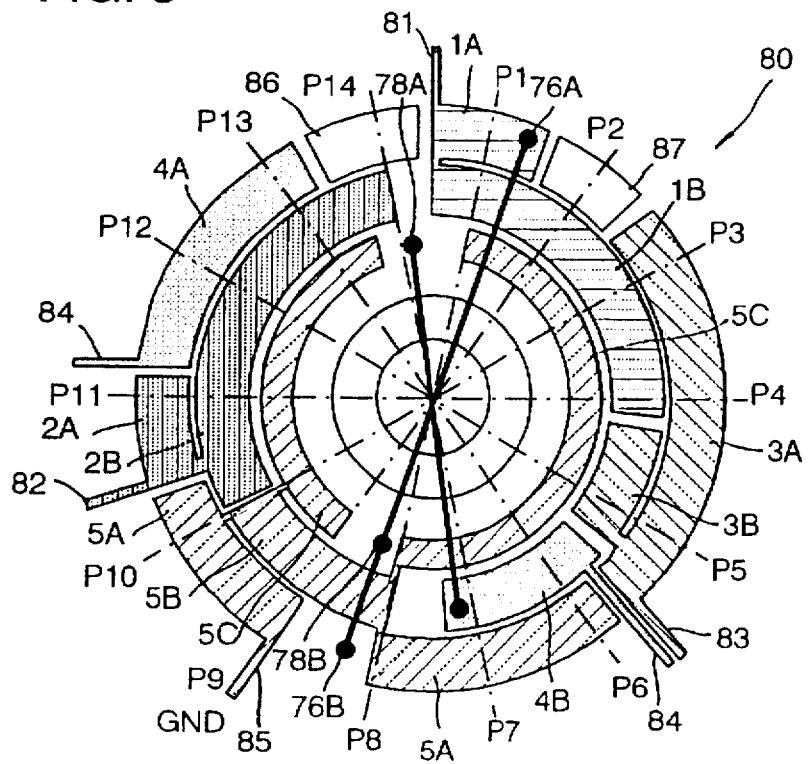
FIG. 9 is a view showing the positional relationship between the conductive segment patterns and contact points when the rotary encoder assumes a position between regular angular positions P1 and P2.

FIG. 9 shows the positional relationship between the signal segment patterns on the conductive segment pattern disk 80 and the conductive contact disk 74 when the up/down dial 36 selects the angular position between the regular angular positions P1 and P2. In this in-between angular position, the contact arms 78A and 78B of the conductive contact disk 74, which are expected to contact with the conductive ground segments 5C of the third circular ground segment pattern at different angular positions, are electrically floated, and in addition, the contact arm 76B, which is expected to contact with the conductive signal segments of the first circular signal segment pattern, is also electrically floated. On the other hand, the remaining contact arms 76A and 76C respectively make contact with the conductive signal segments 1A and 4B similarly to when the up/down dial 36 selects the regular angualr position P1 as shown in FIG. 8. In this way, because the contact arms 78A, 78B and 76B become floated in advance to a shift in angular position of the other contact arms 76A and 76C from the conductive signal segments 1A and 4B to the adjacent conductive signal segments, respectively, approximately simultaneously, the conductive ground segments are electrically disconnected, causing all of the four bit signals S1, S2, S3 and S4 to assume the states (X, X, X and X), respectively. Accordingly, even if the up/down dial 36 selects the regular angular position P2, following the position shift to the in-between angular position, with the result of a shift in angular position of the contact arms 76A and 76C from the conductive signal segments 1A and 4B to the floating segment 87 and conductive ground segment 5A, respectively, there is caused no change in the bit signals S1, S2, S3 and S4. The conductive ground segments of the third circular ground segment pattern and the contact arms 78A and 78B of the conductive contact disk 74 are configured asymmetrically so that both contact arms alternatively become floated simultaneously and not floated every half rotation of the conductive contact disk 74. Together, the ground segment pattern is configured such that, while either one of the contact arms 78A and 78B becomes floated depending upon angular positions the conductive contact disk 74 takes, at least one of the other contact arms 76A, 76B and 76C makes contact with the conductive ground segments 5A and 5B.

It is to be understood that, although the second circular signal segment pattern includes a plurality of different conductive signal segments as well as the first circular signal segment pattern, it may comprises a single conductive signal segment, or may be omitted if desired encode signals can still be provided. Furthermore, it would also be appropriate to provide another concentric circular signal segment pattern comprising at least one conductive signal segment to the inside of the second circular signal segment pattern. The conductive contact disk may have the contact arms which make contact with the first circular signal segment pattern is not limited to two shown by means of example in the embodiment and may be more than two.

With the rotary type encoder of the present invention, the number of concentric circular signal segment patterns is reduced less than the number of bits forming an encoder signal, with the effect of reducing the outer diameter of the conductive segment pattern disk and the diameter of the conductive contact disk, providing an improvement in overall compactness of the rotary type encoder. In the case where the rotary type encoder of the invention has the same size and the same number of bits of an encode signal as a conventional rotary type encoder, widened circular signal segment patterns and contact arms can be used, which always provides an improvement in reliability of the rotary type encoder.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A rotary encoder for providing a plurality of multiple-bit encoded signals according to predetermined angular positions of said rotary encoder, said rotary encoder comprising:

a ground segment pattern comprising a plurality of arcuate conductive ground segments arranged within a first circle;

a signal segment pattern comprising a plurality of arcuate conductive signal segments corresponding to bits of said multiple-bit encoded signal, said arcuate conductive signal segments being arranged concentrically with, and outside of, said first circle; and a rotary contact having a plurality of contact points making contact with one or more of said arcuate conductive signal segments in accordance with varying said predetermined angular positions and at least one contact point making contact with one of said arcuate conductive ground segments to provide bit signals forming said multiple-bit encoded signal;

wherein said signal segment pattern and said rotary slide contact are configured such that only one of said bit signals is changed between adjacent said predetermined angular positions of said rotary encoder.

2. A rotary encoder for providing a plurality of multiple-bit encoded signals according to predetermined angular positions of said rotary encoder, said rotary encoder comprising:

a ground segment pattern comprising a plurality of arcuate conductive ground segments arranged within a first circle;

a signal segment pattern comprising a plurality of arcuate conductive signal segments corresponding to bits of said multiple-bit encoded signal, said arcuate conductive signal segments being arranged concentrically with, and outside of, said first circle; and a rotary contact having a plurality of contact points making contact with one or more of said arcuate conductive signal segments in accordance with varying said predetermined angular positions and at least one contact point making contact with at least one of said arcuate conductive ground segments to provide bit signals forming said multiple-bit encoded signal;

wherein said signal segment pattern and said rotary contact are configured such that more than one of said bit signals are changed between adjacent said predetermined positions only after all of said at least one contact point making contact with said at least one said arcuate conductive ground segments break contact with said at least one said arcuate conductive ground segments prior to changing said bit signals.

3. A rotary encoder as defined in claim 2, wherein said signal segment pattern and said rotary slide contact are configured such that said breaking of contact between said conductive ground segments and said contact points occurs at only one portion of a full rotation of said rotary slide contact.

4. A rotary encoder as defined in claim 3, wherein said conductive ground segments are arranged into two inner arcuate segments of a common radius and at least one concentric outer arcuate segment having a greater radius, said rotary contact makes contact with said outer arcuate ground segment when positioned to contact an area between said inner arcuate ground segments.

* * * * *

UNITED STATES PATENT AND TRADEMARK OFFICE
CERTIFICATE OF CORRECTION

PATENT NO. : 5,799,218
DATED : August 25, 1998
INVENTOR(S) : Nobuhiro AOKI

It is certified that error appears in the above-indentified patent and that said Letters Patent is hereby corrected as shown below:

On the title page, insert Item [30] as follows:

--[30]    Foreign Application Priority Data

June    30,    1995    [JP]    Japan ....... 7-166504--

Signed and Sealed this

Twenty-ninth Day of December, 1998

Attest:

BRUCE LEHMAN

Attesting Officer      Commissioner of Patents and Trademarks